United States Patent
Asada et al.

(10) Patent No.: US 11,190,263 B2
(45) Date of Patent: Nov. 30, 2021

(54) RECEIVING DEVICE, RECEIVING METHOD, AND RECEIVING SYSTEM

(71) Applicant: PANASONIC INTELLECTUAL PROPERTY MANAGEMENT CO., LTD., Osaka (JP)

(72) Inventors: Yohei Asada, Kanagawa (JP); Ryohei Shindo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/031,384

(22) Filed: Sep. 24, 2020

(65) Prior Publication Data

US 2021/0006323 A1 Jan. 7, 2021

Related U.S. Application Data

(63) Continuation of application No. PCT/JP2019/014368, filed on Mar. 29, 2019.

(30) Foreign Application Priority Data

Mar. 29, 2018 (JP) .............................. JP2018-066239

(51) Int. Cl.
*H04L 5/12* (2006.01)
*H04L 23/02* (2006.01)
(Continued)

(52) U.S. Cl.
CPC ........ *H04B 7/0854* (2013.01); *H04B 1/71057* (2013.01); *H04B 1/76* (2013.01); *H04B 7/0828* (2013.01)

(58) Field of Classification Search
CPC .... H04B 7/0854; H04B 1/71057; H04B 1/76; H04B 7/0828; H04B 7/0845; H04L 25/03057; H04L 25/03891
(Continued)

(56) References Cited

U.S. PATENT DOCUMENTS 5,119,401 A 6/1992 Tsujimoto
5,689,528 A 11/1997 Tsujimoto
(Continued)

FOREIGN PATENT DOCUMENTS

JP 03-284011 12/1991
JP 07-086972 3/1995
JP 2663820 6/1997

OTHER PUBLICATIONS

International Search Report (ISR) issued in International Patent Application No. PCT/JP2019/014368, dated May 7, 2019, along with an English translation thereof.
(Continued)

*Primary Examiner* — Tanmay K Shah
(74) *Attorney, Agent, or Firm* — Greenblum & Bernstein, P.L.C.

(57) ABSTRACT

A receiving device includes an equalization processor including multiple delay equalizers. The equalization processor is configured to: obtain a first error between an output of one specific tap in the multiple delay equalizers and a predetermined reference value, and calculate a first weight with which the first error is minimized; cause a calculation result of the first weight to be reflected in all taps in the multiple delay equalizers except the specific tap, obtain a second error between outputs of all taps in the multiple delay equalizers and the predetermined reference value, and calculate a second weight with which the second error is minimized; and update coefficients of all taps in the multiple delay equalizers at the same timing using the calculation result of the first weight and a calculation result of the second weight, and calculate an output of the equalization processor.

20 Claims, 6 Drawing Sheets

(51) Int. Cl.
  *H04B 7/08* (2006.01)
  *H04B 1/7105* (2011.01)
  *H04B 1/76* (2006.01)

(58) Field of Classification Search
  USPC .......................................................... 375/262
  See application file for complete search history.

(56) References Cited

U.S. PATENT DOCUMENTS

| | | | | |
|---|---|---|---|---|
| 6,745,050 | B1* | 6/2004 | Forsythe | H04B 7/0845 370/342 |
| 6,970,524 | B1* | 11/2005 | Zeng | H04B 7/0845 375/347 |
| 10,848,708 | B2* | 11/2020 | Van Belle | H04N 9/646 |
| 2004/0190649 | A1* | 9/2004 | Endres | H03G 3/3089 375/326 |
| 2004/0198452 | A1* | 10/2004 | Roy | H04B 7/0874 455/562.1 |
| 2005/0018765 | A1* | 1/2005 | Endres | H04L 25/03057 375/233 |
| 2015/0222322 | A1* | 8/2015 | Moffatt | H04L 27/2647 375/136 |
| 2021/0227209 | A1* | 7/2021 | Liu | H04N 19/52 |

OTHER PUBLICATIONS

Written Opinion (WO) issued in International Patent Application No. PCT/JP2019/014368, dated May 7, 2019, along with an English translation thereof.

\* cited by examiner

RECEIVING DEVICE, RECEIVING METHOD, AND RECEIVING SYSTEM

CROSS-REFERENCE TO RELATED APPLICATIONS

This application is a continuation of PCT International Patent Application No. PCT/JP2019/014368 filed on Mar. 29, 2019, which claims the benefit of priority of Japanese Patent Application No. 2018-066239 filed on Mar. 29, 2018, the enter contents of which are incorporated herein by reference.

FIELD

The present disclosure relates to a receiving device, a receiving method, and a receiving system that receive a radio signal such as an FM broadcast wave.

BACKGROUND

When a radio signal is received by a receiving device, multipath interference is one of factors that hinder the signal quality of a reception signal. The multipath interference is caused such that signal waves arriving through a plurality of paths have time differences and these signal wave interferences one another, and the multipath interference results in a decrease in reception electric field, an angle detection shift during demodulation due to phase shift, or the like, and signal quality such as sound quality of the reception signal deteriorates. Here, multipath interference when FM broadcasting is received in a receiving device of a moving object such as an in-vehicle radio receiver will be described as an example.

As a first means for improving the quality deterioration of the reception signal caused by the multipath interference, there is, for example, a diversity reception method. In the diversity reception method, a phase diversity method (adaptive array antenna) in which two antennas are arrayed in an array to reduce interference is often adopted. The phase diversity method is a mechanism for removing interference by utilizing a fact that reception waves that arrive at two antennas have a phase difference (path difference) depending on a distance with the antennas. A method of removing interference by phase diversity may also be referred to as spatial equalization. In spatial equalization in FM reception, a Constant Modulus Algorithm (CMA) technique using constant envelope characteristics of an FM signal is generally applied in order to have adaptability corresponding to a propagation state of a radio signal. In an FM signal, audio information is superimposed by giving a temporal change to a carrier frequency, and there is no variation in amplitude of a carrier wave. In the CMA, a constant amplitude characteristic of the FM signal is used and a weight of amplitude and a phase is adjusted by feedback control so as to make a temporal change of the signal amplitude zero at a reception point, and the weight is driven to a target value to realize adaptive processing.

As a second means for improving the quality deterioration of the reception signal caused by the multipath interference, for example, there is a delay equalizer that estimates a propagation state of a radio signal from a state of a reception wave and corrects an inverse state (inverse characteristic) of the propagation state by a delay tap. A method of removing interference by the delay equalizer may also be referred to as temporal equalization. The adaptive processing in the delay equalizer is realized by feedback control using CMA as in the case of phase diversity.

Further, as a third means for improving the quality deterioration of the reception signal caused by the multipath interference, there is a multi-tap phase diversity method in which the above-described phase diversity and delay equalizer are combined. JP-B-2663820 discloses, as an example of the multi-tap phase diversity method, a decision feedback equalizer that constitutes a temporal-spatial equalization system in which spatial equalization based on an adaptive array antenna and temporal equalization based on a Tapped Delay Line (TDL) filter is combined. In the multi-tap phase diversity method, the adaptive processing is also realized by feedback control using CMA as in the case of the phase diversity or the delay equalizer.

SUMMARY

In the above-described multi-tap phase diversity method in the related art, since the adaptive processing is executed by handling the weight of the spatial equalization and the weight of the temporal equalization equally in one update rule, there is a problem that an effect of the spatial equalization is difficult to obtain, and ideal equalization processing cannot be easily implemented. When an attempt is made to cause a correction value to converge to an optimum solution in the temporal-spatial equalization system in the related art, complicated calculation is necessary, and a large calculation circuit and a large amount of time are required, so that it is difficult to provide a practical receiving device, for example, when the receiving device is applied to a moving object such as an in-vehicle radio receiver.

The present disclosure was proposed in view of the above-described circumstances in the related art, and an object thereof is to provide a receiving device, a receiving method, and a receiving system capable of performing more appropriate equalization processing in a multi-tap phase diversity method in which spatial equalization and temporal equalization is combined.

The present disclosure provides a receiving device including: an equalization processor which includes multiple delay equalizers that respectively receive multiple reception signals through an array antenna, and which performs equalization processing of spatial equalization and temporal equalization on the reception signals, wherein the equalization processor is configured to: obtain a first error which is a difference between an output of one specific tap in the multiple delay equalizers and a predetermined reference value, calculate a first weight with which the first error is minimized; cause a calculation result of the first weight to be reflected in all taps in the multiple delay equalizers except the specific tap, obtain a second error which is a difference between outputs of all taps in the multiple delay equalizers and the predetermined reference value, and calculate a second weight with which the second error is minimized; and update coefficients of all taps in the multiple delay equalizers at the same timing using the calculation result of the first weight and a calculation result of the second weight, and calculate an output of the equalization processor.

The present disclosure provides a receiving system including: a reception signal input device which inputs a reception signal of a radio wave; an equalization processor which performs equalization processing of the reception signal; and a sound signal output device which outputs an equalized signal, wherein the reception signal input device includes: an array antenna including multiple antennas that receive radio waves of a desired wave; and front ends configured to perform frequency conversion of the received multiple signals, respectively, wherein the sound signal output device includes: an output signal amplifier that amplifies the equalized signal; and a sound output device that outputs an amplified signal as a sound signal, and wherein the equalization processor includes multiple delay equalizers that respectively receive multiple reception signals, and performs equalization processing of spatial equalization and temporal equalization on the reception signals, the equalization processor being configured to: obtain a first error which is a difference between an output of one specific tap in the multiple delay equalizers and a predetermined reference value, calculate a first weight with which the first error is minimized; cause a calculation result of the first weight to be reflected in all taps in the multiple delay equalizers except the specific tap, obtain a second error which is a difference between outputs of all taps in the multiple delay equalizers and the predetermined reference value, and calculate a second weight with which the second error is minimized; update coefficients of all taps in the multiple delay equalizers at the same timing using the calculation result of the first weight and a calculation result of the second weight, and calculate an output of the equalization processor.

The present disclosure provides a receiving method to be performed in a receiving device, the receiving device including: an equalization processor which includes multiple delay equalizers that respectively receive multiple reception signals through an array antenna, and which performs equalization processing of spatial equalization and temporal equalization on the reception signals, and the receiving method includes: in the equalization processor, obtaining a first error which is a difference between an output of one specific tap in the multiple delay equalizers and a predetermined reference value, calculating a first weight with which the first error is minimized, causing a calculation result of the first weight to be reflected in all taps in the multiple delay equalizers except the specific tap, obtaining a second error which is a difference between outputs of all taps in the multiple delay equalizers and the predetermined reference value, calculating a second weight with which the second error is minimized, updating coefficients of all taps in the multiple delay equalizers at the same timing using the calculation result of the first weight and a calculation result of the second weight, and calculating an output of the equalization processor.

According to the present disclosure, it is possible to perform more appropriate equalization processing in the multi-tap phase diversity method in which the spatial equalization and the temporal equalization is combined.

BRIEF DESCRIPTION OF DRAWINGS

FIGS. 5A and 5B are illustrating a multipath occurrence situation, in which

DETAILED DESCRIPTION

Hereinafter, embodiments specifically describing a receiving device, a receiving method, and a receiving system according to the present disclosure will be described in detail with reference to the accompanying drawings as appropriate. However, detailed descriptions beyond what is necessary may be omitted. For example, detailed descriptions of a subject matter that is previously well-known, as well as redundant descriptions of components that are substantially the same will be omitted in some cases. This is for avoiding unnecessary redundancy in the following description and for facilitating understanding by a person skilled in the art. The accompanying drawings and the following descriptions are provided to help a person skilled in the art to fully understand the present disclosure, and thereby are not intended to limit the subject matter described in the claims.

How Content of Present Embodiment is Obtained

Here, a specific example of a problem of the multi-tap phase diversity method will be described. Hereinafter, a multipath occurrence situation when a radio signal such as FM radio broadcasting is received and an example of equalization processing using the multi-tap phase diversity method will be described.

Figure 5A:
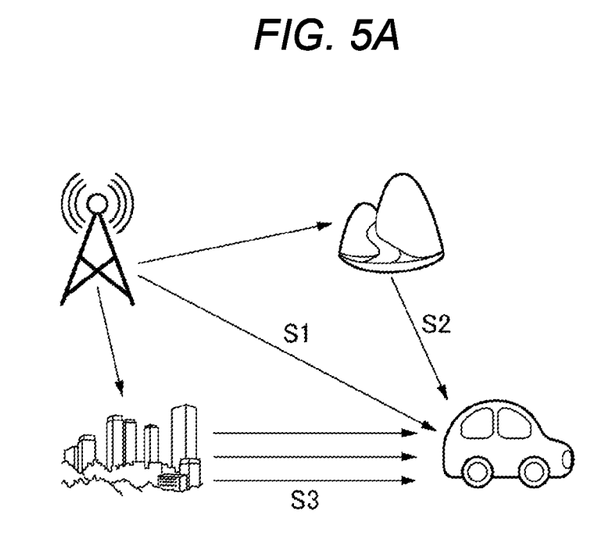
FIG. 5A shows an image of a plurality of propagation paths of a radio signal at the time of multipath occurrence.
Figure 5B:
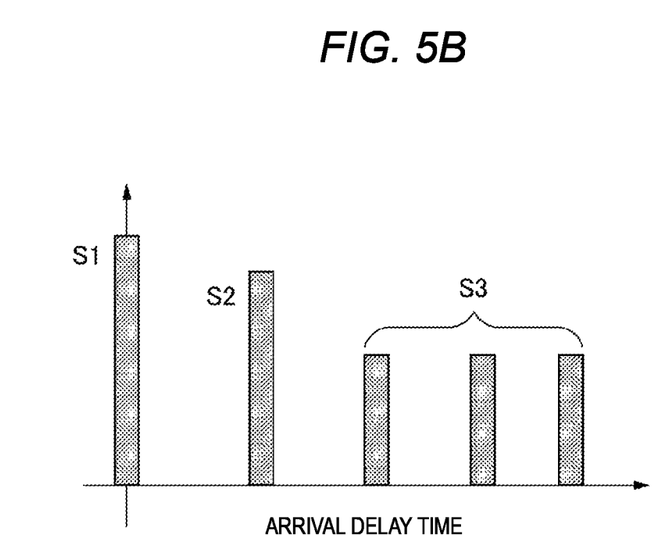
FIG. 5B shows arrival times of respective reception waves.

FIGS. 5A and 5B are diagrams illustrating a multipath occurrence situation, in which FIG. 5A shows an image of a plurality of propagation paths of a radio signal at the time of multipath occurrence, and FIG. 5B shows arrival times of respective reception waves. For example, a radio wave transmitted from a transmitting antenna of a broadcasting station propagates to a receiving antenna of a receiving device through a plurality of propagation paths, a plurality of reception waves such as a desired wave S1 that propagates directly, a main multipath interference wave S2 reflected by mountains or buildings, and other multipath interference waves S3 that are reflected multiple times in a building dense area or the like. In this case, the main interference wave S2 and other interference waves S3 are delayed with respect to the desired wave S1 to arrive at the receiving antenna.

Figure 6:
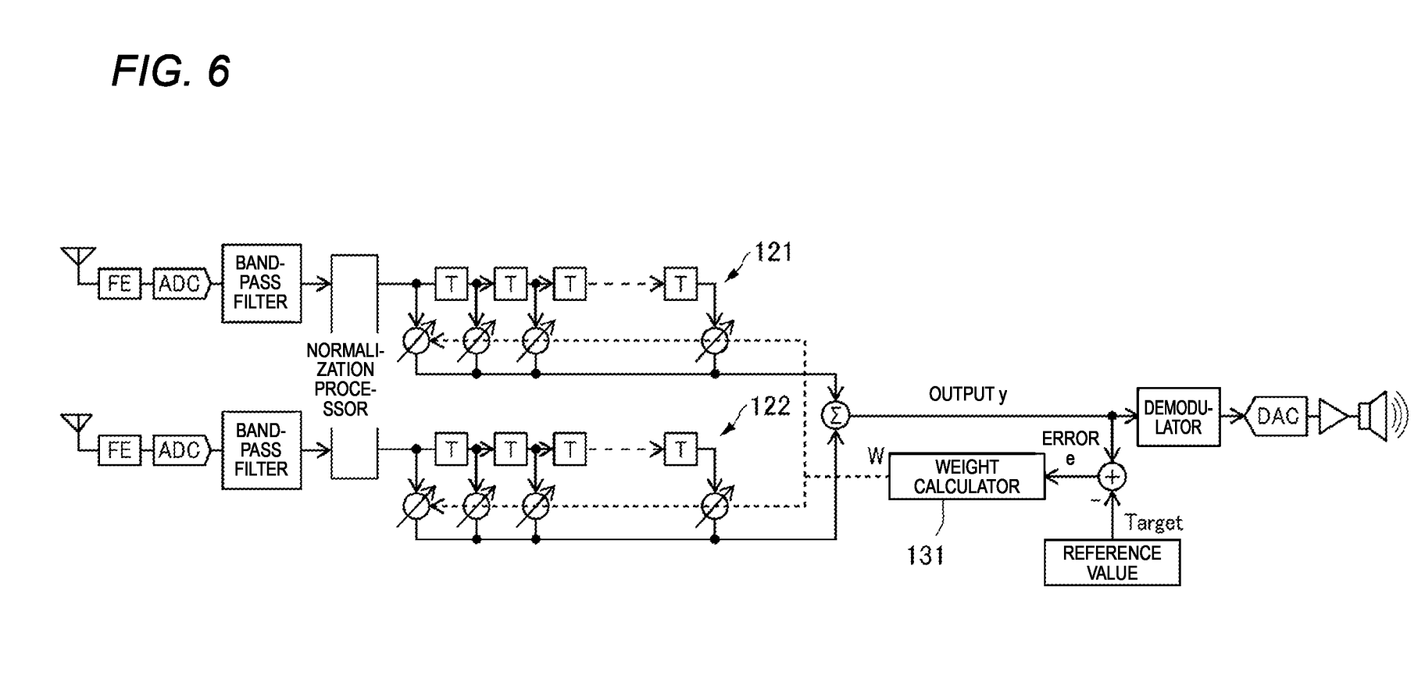
FIG. 6 shows a configuration example of a general multi-tap phase diversity receiving device as a comparative example.

FIG. 6 shows a configuration example of a general multi-tap phase diversity receiving device as a comparative example. When equalization processing of a reception signal is performed using the multi-tap phase diversity method under a multipath environment as described above, a weight of spatial equalization and a weight of temporal equalization are calculated by one update rule using delay equalizers 121, 122 based on multiple sets of TDL filters (two sets in the illustrated example), so as to perform adaptive processing. At this time, in order to cancel the interference waves S2 and S3, an error e between output y of the delay equalizers 121, 122 and a reference value Target is calculated, and a weight W of each tap for minimizing the error e is calculated using the CMA by a weight calculator 131. Then, feedback control is performed by applying the weight W to a phase shifter of each tap of the delay equalizers 121, 122, and the output y converges to an optimum value. For example, when the two delay equalizers 121, 122 are respectively configured by a TDL filter with 16 taps, it is difficult for the weight to converge to an optimum solution because the weight is calculated using 32 variables in total, which is complicated calculation.

Figure 7:
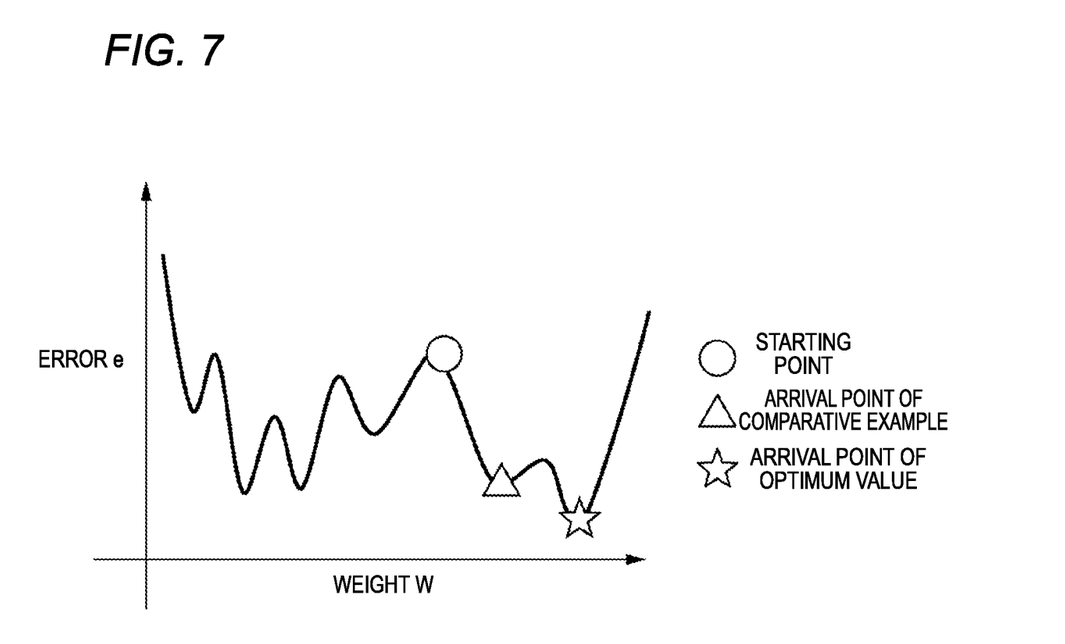
FIG. 7 is a diagram showing an example of a relationship between a weight and an error when equalization processing is performed by a multi-tap phase diversity method of the comparative example.

FIG. 7 is a schematic diagram showing an example of a relationship between the weight and the error when equalization processing is performed by the multi-tap phase diversity method of the comparative example shown in FIG. 6. When the error e with respect to the weight W is shown two-dimensionally as shown in FIG. 7, it is assumed that an initial state of the weight W is a value in a white circle, and control of the equalization processing is started from a starting point in the white circle. In this case, the equalization processing needs to aim a value in a star mark with which the error e is minimized, that is, an arrival point of the optimum value, but actually the control stops at a value in a white triangle, that is, an arrival point of the comparative example. This is because in the equalization processing of the comparative example, an appropriate weight correction value is considered to be satisfied at a value (minimum solution) that is close to a minimum value from the starting point, so that the control ends. In the equalization processing of the comparative example, in order to obtain converge to the arrival point of the optimum value, complicated calculation is necessary, and a large calculation circuit and a large amount of time are required. For example, in a receiving device of a moving object such as an in-vehicle radio receiver, since it is desired to have a configuration capable of performing high-speed processing with calculation as simple as possible, it is not realistic from the viewpoint of the amount of calculation processing and time followability of adaptive processing. Therefore, there is a problem that noise caused by the multipath interference waves cannot be canceled and the noise is generated in the reception signal.

Therefore, the present embodiment shows a configuration example of a receiving device, a receiving method, and a receiving system in which in the multi-tap phase diversity method, a result of the adaptive processing can converge to an optimum value, and more appropriate equalization processing can be performed.

In the present embodiment, as examples of the receiving device, the receiving method, and the receiving system according to the present disclosure, for example, a configuration example applicable to an FM radio receiver mounted in a vehicle is shown.

Configuration of Present Embodiment

Figure 1:
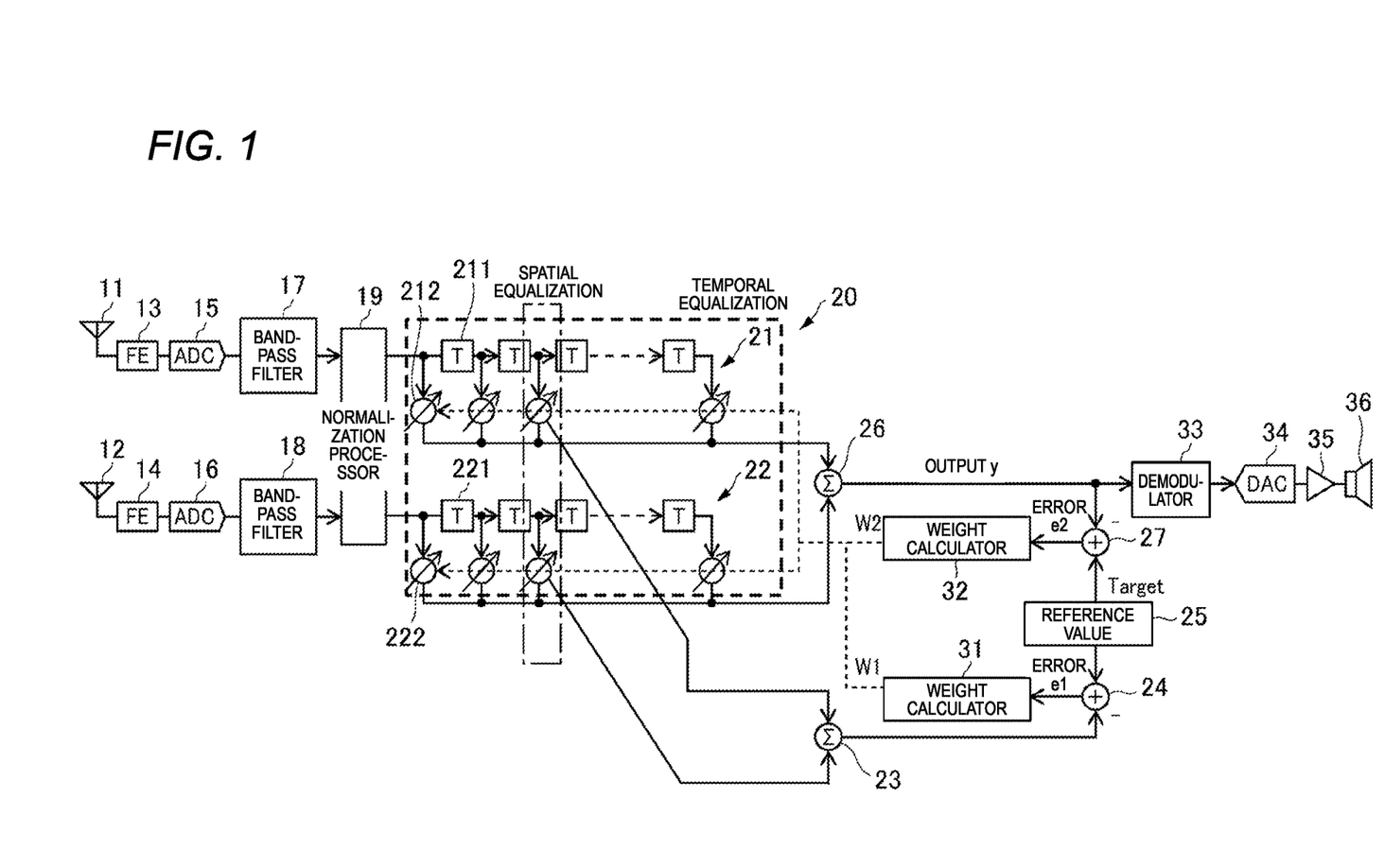
FIG. 1 is a block diagram showing a configuration of a receiving device and a receiving system according to an embodiment.

FIG. 1 is a block diagram showing a configuration of the receiving device and the receiving system according to the embodiment. The receiving device of the present embodiment has an equalization processor 20 including multiple delay equalizers (two delay equalizers in the illustrated example) that perform equalization processing of radio signals such as FM radio broadcasting. The receiving system of the present embodiment includes, as a reception signal input device, multiple antennas 11, 12 (two antennas in the illustrated example), front ends (FE) 13, 14, A/D converters (ADC: Analog to digital converter) 15, 16, and band-pass filters 17, 18. The receiving system may include a normalization processor 19 and a demodulator 33. Further, the receiving system includes, as a sound signal output device, a D/A converter (DAC: Digital to Analog Converter) 34, an amplifier 35, and a speaker 36.

The antennas 11, 12 are arranged at half wavelength intervals of a frequency of a desired wave, for example, and forms an array antenna that receives radio signals such as FM radio broadcasting by the two receiving units. The front ends 13, 14 perform frequency conversion and the like on reception signals in the RF (radio frequency band) received by the antennas 11, 12. The A/D converters 15, 16 convert the reception signals output from the front ends 13, 14 from analog signals into digital signals. The band-pass filters 17, 18 allows reception signals in a predetermined frequency band including the frequency of the desired wave to pass, and blocks signals in other bands. The normalization processor 19 performs normalization processing for aligning signal levels of the two reception signals. The reception signal input device may be configured by an input interface or the like for inputting a reception signal of a radio wave of a desired wave from the array antenna.

The demodulator 33 includes an FM demodulator that demodulates an FM signal of a reception signal and performs FM demodulation such as stereo demodulation of left and right sound signals. The D/A converter 34 converts a demodulated signal of the digital signal output from the demodulator 33 into an analog signal. The amplifier 35 is an example of an output signal amplifier, and includes an amplifier that amplifies a sound signal obtained by converting the demodulated signal into the analog signal. The speaker 36 is an example of a sound output device, reproduces and outputs a sound signal, and reproduces sound such as FM radio broadcasting. The sound output device is not limited to the speaker 36, and various devices such as a headphone, an earphone, and a headset may be used. The sound signal output device may be configured by an output interface or the like for outputting a sound signal of a demodulated signal.

The equalization processor 20 includes two delay equalizers 21, 22, a first combiner 23, a first adder 24, a reference value outputter 25, a second combiner 26, a second adder 27, a first weight calculator 31, and a second weight calculator 32. The equalization processor 20 performs adaptive processing by feedback control using CMA. Each of the delay equalizers 21, 22 is a delay equalizer based on a TDL filter, and is a delay equalizer of a plurality of taps (N taps in this case). Here, the first delay equalizer 21 is referred to as a main TDL and the second delay equalizer 22 is referred to as a sub TDL. Each of the delay equalizer 21, 22 includes N−1 delay elements 211, 221 of delay times T, and N complex multipliers 212, 222. An array antenna of three or more antennas may be provided in the reception signal input device, and the equalization processor may include three or more delay equalizers according to the array antenna.

The first combiner 23 combines outputs of the two complex multipliers 212, 222 in one specific tap. The reference value outputter 25 outputs a predetermined reference value Target. The first adder 24 obtains a difference between the output of the first combiner 23 and the reference value Target by subtracting the reference value Target of the output of the reference value outputter 25 from the output of the first combiner 23, and calculates an error e1 as a first error. The first weight calculator 31 calculates, as a first weight, a weight W1 with which the error e1 is minimized by using the CMA. The weight W1 is used as a weight for spatial equalization.

The second combiner 26 combines the outputs of the two complex multipliers 212, 222 in all of the N taps. The second adder 27 obtains a difference between the output of the second combiner 26 and the reference value Target by subtracting the reference value Target of the output of the reference value outputter 25 from the output of the second combiner 26, and calculates an error e2 as a second error. The second weight calculator 32 calculates, as a second weight, a weight W2 with which the error e2 is minimized by using the CMA. The weight W2 is used as a weight for temporal equalization.

Calculation of the weight W1 and the weight W2 is performed by using, for example, a Least Mean Square (LMS) algorithm to calculate update amounts of the weights W1, W2 with which the errors e1, e2 are set to zero.

In the present embodiment, the delay equalizers 21, 22 perform simultaneously spatial equalization based on phase diversity and temporal equalization based on the respective main TDL and sub TDL in the order from the spatial equalization to the temporal equalization. Specifically, in a temporal-spatial equalization system, the weight W1 of one tap for performing the spatial equalization is updated, and the update amount is propagated, as a rotation vector of the complex multipliers 212, 222, by multiplying the weights W2 of other taps, and then the weights W2 is updated by the temporal equalization. The update of the weight W1 and the weight W2 by the spatial equalization and the temporal equalization is implemented by coefficient update of one time.

Operation of Present Embodiment

Figure 2:
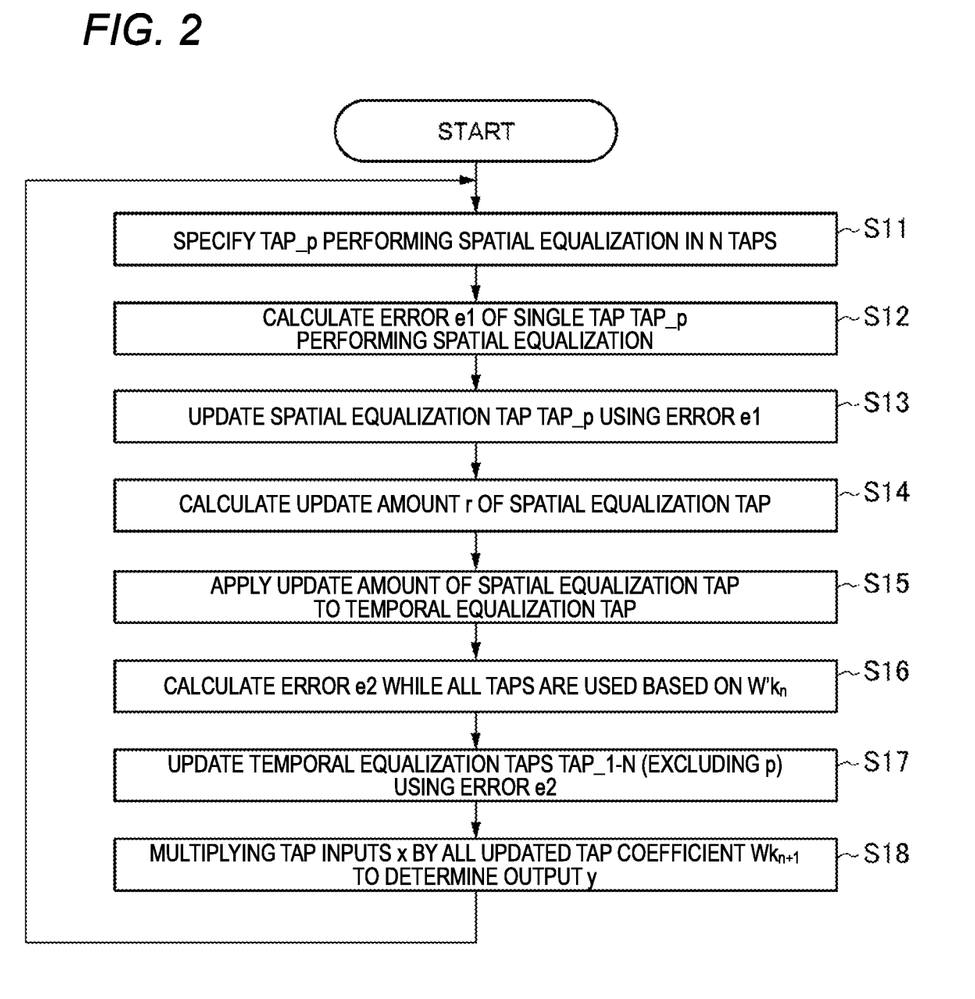
FIG. 2 is a flowchart showing an operation of equalization processing of the receiving device according to the embodiment.

FIG. 2 is a flowchart showing an operation of the equalization processing of the receiving device according to the embodiment. Hereinafter, each tap of the delay equalizer is also referred to as a TAP.

First, in the delay equalizers 21, 22, a specific TAP_p for performing spatial equalization is specified in the N TAPs (TAP_1 to TAP_n) (step S11). The number p of the TAP is expressed by the following Formula (1).

$$1 \leq P \leq N \qquad (1)$$

In the example of FIG. 1, one TAP surrounded by a dashed line corresponds to the TAP for spatial equalization. For the TAP for performing the spatial equalization, for example, a first TAP_1 (p=1) is specified. The TAP for performing the spatial equalization may be specified freely as appropriate, such as p=N/2 (TAP in the middle). Hereinafter, the TAP for performing the spatial equalization is also referred to as a spatial equalization TAP. In FIG. 1, all of the N TAPs surrounded by a broken line correspond to a TAP for temporal equalization. Hereinafter, the TAP for performing temporal equalization is also referred to as a temporal equalization TAP.

Next, in the delay equalizers 21, 22, the first combiner 23 and the first adder 24, the error e1 of a single spatial equalization TAP (TAP_p) is calculated (step S12). As shown in the following Formula (2), in the TAP_p, a product of a tap coefficient $W_{main}$ of the main TDL and an input value $x_{main}$ and a product of a tap coefficient $W_{sub}$ of the sub TDL and an input value $x_{sub}$ are added by the first combiner 23, the combined value is subtracted from the reference value Target by the first adder 24, and thus the error e1 is calculated.

(Formula (2))

$$e1 = \text{Target} - |W_{mainp_n} \cdot x_{mainp_n} + W_{subp_n} \cdot x_{subp_n}| \qquad (2)$$

Next, using the calculated error e1, the weight W1 is calculated in the first weight calculator 31, and a coefficient of the spatial equalization TAP (TAP_p) is updated (step S13). The weight of the TAP_p is updated to $Wp_{n+1}$ as shown in the following Formula (3).

(Formula (3))

$$Wp_n \Rightarrow Wp_{n+1} \qquad (3)$$

Then, in the spatial equalization TAP of the delay equalizers 21, 22, an update amount r of the spatial equalization TAP is calculated (step S14). The update amount r corresponds to an amount of variation in phase and amplitude of the spatial equalization TAP, and is obtained by the following Formula (4). In Formula (4), a superscript—represents a complex conjugate.

(Formula (4))

$$r = \frac{Wp_{n+1} \cdot \overline{Wp_n}}{|Wp_n|^2} \qquad (4)$$

Next, in temporal equalization TAPs other than the spatial equalization TAP of the delay equalizers 21, 22, the update amount r of the spatial equalization TAP is applied to reflect (propagate) an update amount (step S15). A weight of TAP_k is updated to $r \cdot Wk_n$ as shown in the following Formula (5). Here, in order to propagate the update amount r of the spatial equalization TAP to other temporal equalization TAPs, k of the TAP_k is set to 1 to N excluding p.

(Formula (5))

$$W'k_n \Rightarrow r \cdot Wk_n \qquad (5)$$

(k=1, N excluding p)

Next, in the delay equalizers 21, 22, the second combiner 26, and the second adder 27, the error e2 in a state in which all TAPs of the temporal equalization TAPs are used is calculated based on updated weights $W'k_n$ of the respective TAPs (step S16). As shown in the following Formula (6), in the TAP_k (K=1 to N), a product of a tap coefficient $W'_{main}$ of the main TDL after spatial equalization propagation and an input value $x_{main}$ and a product of a tap coefficient $W'_{sub}$ of the sub TDL after spatial equalization propagation and an input value $x_{sub}$ are added and accumulated by the second combiner 26, the combined value is subtracted from the reference value Target by the second adder 27, and thus the error e2 is calculated.

(Formula (6))

$$e2 = \text{Target} - \sum_{k=1}^{N} |W'_{maink_n} \cdot x_{maink_n} + W'_{subk_n} \cdot x_{subk_n}| \qquad (6)$$

Next, using the calculated error e2, the weight W2 is calculated by the second weight calculator 32, and coefficients of the temporal equalization TAP_1 to TAP_N (excluding p) are updated (step S17). The weight of the TAP_k (k=1 to N (excluding p)) is updated to $Wk_{n+1}$ as shown in the following Formula (7).

(Formula (7))

$$Wk_n \Rightarrow Wk_{n+1} \quad (7)$$

(k=1, . . . , N, excluding p)

Then, the delay equalizers 21, 22 determine the output y by applying inputs x of the TAPs by all of the respective updated TAP coefficients $Wk_{n+1}$ (step S18). As shown in the following Formula (8), in the TAP_k (K=1 to N), a product of the updated tap coefficient $W'_{main}$ of the main TDL and an input value $x_{main}$ and a product of an updated tap coefficient $W'_{sub}$ of the sub TDL and an input value $x_{sub}$ are added and accumulated by the second combiner 26, and thus the output v is calculated.

(Formula (8))

$$y = \sum_{k=1}^{N} \left| W'_{main k_{n+1}} \cdot x_{main k_n} + W'_{sub k_{n+1}} \cdot x_{sub k_n} \right| \quad (8)$$

The equalization processing in steps S11 to S18 is repeated in a predetermined time unit (frame), and the equalization processing is sequentially performed for each frame.

By the above equalization processing, the spatial equalization performed in a specific tap and the temporal equalization performed in all taps by reflecting and propagating the result of the spatial equalization onto all of other taps is performed at the same coefficient update timing. Accordingly, it is possible to provide a temporal-spatial equalization system capable of appropriately combining the spatial equalization and the temporal equalization and to make the weight converge to an optimum solution.

Figure 3:
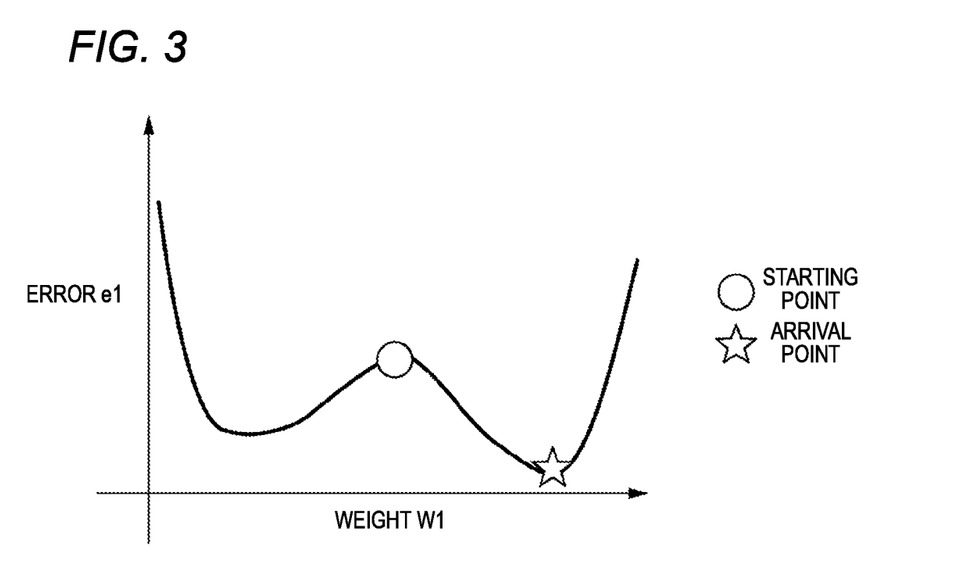
FIG. 3 is a diagram showing an example of a relationship between a weight and an error when spatial equalization is performed in the equalization processing according to the embodiment.
Figure 4:
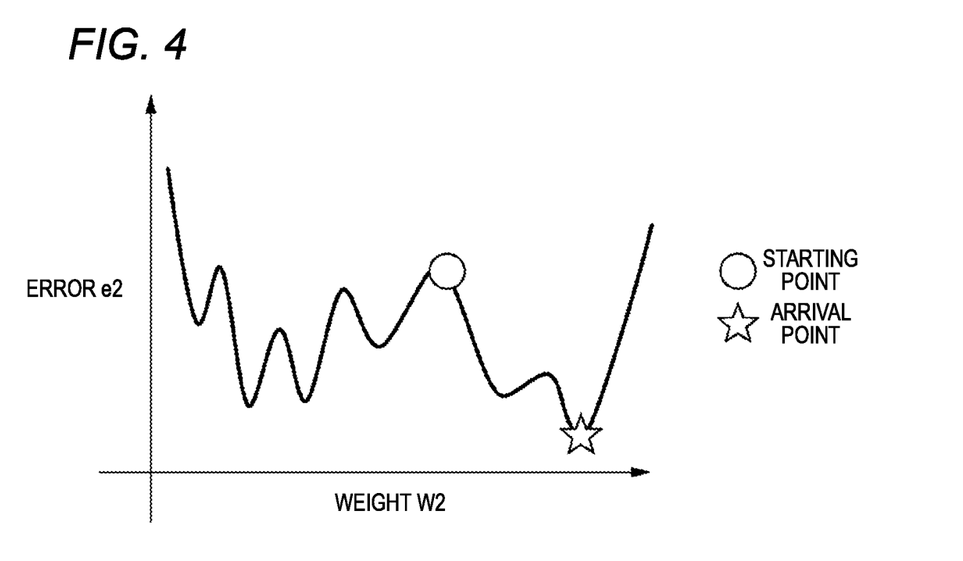
FIG. 4 is a diagram showing an example of a relationship between a weight and an error when temporal equalization is performed in the equalization processing according to the embodiment.

FIG. 3 is a schematic diagram showing an example of a relationship between a weight and an error when spatial equalization is performed in the equalization processing according to the embodiment, and FIG. 4 is a schematic diagram showing an example of a relationship between a weight and an error when temporal equalization is performed in the equalization processing according to the embodiment.

Here, as shown in FIGS. 3 and 4, it is assumed that the error e1 with respect to the weight W1 based on the spatial equalization and the error e2 with respect to the weight W2 based on the temporal equalization are respectively shown two-dimensionally. In this case, it is assumed that the initial states of the weights W1, W2 are values in white circles, and the control of the equalization processing is started from the starting point in the white circle.

In this case, the error e1 seen from the weight W1 based on the spatial equalization is as shown in FIG. 3, and the control of the equalization processing can converge to a value in a star mark with which the error e1 is minimized, that is, an arrival point of the optimum value. Accordingly, for example, in a situation where multipath occurs as shown in FIGS. 5A and 5B, since equalization processing can be performed by focusing on the main multipath interference wave S2 having a large interference effect by the spatial equalization, the interference wave S2 can be effectively cancelled. The spatial equalization according to the present embodiment can be performed by simple calculation of one tap, and the error e1 can be easily brought close to the arrival point of the optimum value.

The error e2 seen from the weight W2 based on the temporal equalization is as shown in FIG. 4, and in the present embodiment, the update amount of the weight W1 based on the spatial equalization is propagated to all taps of the temporal equalization, so that the control of the equalization processing can be prevented from being ended at a point close to a minimum value from the starting point. Therefore, the fine adjustment of the equalization processing based on the temporal equalization can be continued, and the control of the equalization processing can converge to the arrival point of the optimum value with which the error e2 is minimized. Therefore, for example, in a situation where multipath occurs as shown in FIGS. 5A and 5B, equalization processing on interference including other multipath interference waves S3 having a small interference effect can be performed by the temporal equalization, and noise of the reception signal can be reduced.

As described above, in the present embodiment, the result of the spatial equalization of one tap is reflected in the temporal equalization and the weights are updated at the same timing, so that the spatial equalization and the temporal equalization are appropriately performed while the results of the spatial equalization and the temporal equalization does not affect each other. Accordingly, interference in the reception signal can be effectively removed, for example, under a multipath occurrence environment during reception of FM radio broadcasting. Therefore, according to the present embodiment, the control can converge to an ideal error arrival point that is not obtained by a general multi-tap phase diversity method, and equalization processing of temporal-spatial equalization with less noise can be provided.

As described above, the receiving device according to the present embodiment includes the equalization processor 20 which has the multiple delay equalizers 21, 22 that respectively receive multiple reception signals through the array antennas 11, 12, and which performs equalization processing of the spatial equalization and the temporal equalization on the reception signal. The equalization processor 20 obtains the first error e1 which is a difference between an output of one specific tap in the multiple delay equalizers 21, 22 and the predetermined reference value Target, and calculates the first weight W1 with which the first error e1 is minimized. The equalization processor 20 causes the calculation result of the first weight W1 to be reflected in all taps in the multiple delay equalizers 21, 22 except the specific tap, obtains the second error e2 which is a difference between the outputs of all taps in the multiple delay equalizers 21, 22 and the predetermined reference value Target, and calculates the second weight W2 with which the second error e2 is minimized. Further, the equalization processor 20 updates the coefficients of all taps in the multiple delay equalizers 21, 22 at the same timing using the calculation results of the first weight W1 and the second weight W2, and calculates the output y of the equalization processor 20.

In the receiving device of the present embodiment, each of the multiple delay equalizers 21, 22 has N taps of TAP_1 to TAP_n. The equalization processor 20 specifies a specific tap TAP_p among the N taps as a tap for performing the spatial equalization, calculates the first weight W1 based on the output of the tap TAP_p in the multiple delay equalizers 21, 22, and updates the coefficient of the tap TAP_p. In a state where the update amount of the tap TAP_p is reflected in the taps TAP_1 to TAP_n except the tap TAP_p, the equalization processor 20 calculates the second weight W2 based on the outputs of the N taps TAP_1 to TAP_n, and updates the coefficients of the taps TAP_1 to TAP_n except the tap TAP_p. The equalization processor 20 updates the coefficient of the tap TAP_p based on the first weight W1 and the coefficients of the taps TAP_1 to TAP_n except the tap TAP_p based on the second weight W2 at the same coefficient update timing.

Therefore, in the multi-tap phase diversity method in which the spatial equalization and the temporal equalization is combined, a problem that the control is ended at a point close to the minimum value from the starting point of the equalization processing can be prevented, and the result of the adaptive processing can converge to the optimum value. Therefore, more appropriate equalization processing can be performed in adaptive control of the spatial equalization and the temporal equalization, and the main interference wave having a large interference effect at the time of multipath occurrence can be effectively cancelled. Therefore, it is possible to prevent a decrease in received power of a desired wave such as FM radio broadcasting, to obtain a reception signal with less noise, and to prevent deterioration in sound quality of the reception signal.

The receiving system according to the present embodiment is a receiving system including the reception signal input device that inputs a reception signal of a radio wave, the equalization processor 20 that performs equalization processing of the reception signal, and a sound signal output device that outputs an equalized signal. The reception signal input device includes the array antenna having the multiple antennas 11, 12 that receive radio waves of a desired wave, and the front ends 13, 14 that respectively perform frequency conversion of the received multiple signals. The sound signal output device includes the amplifier 35 that amplifies an equalized signal, and the speaker 36 that outputs the amplified signal as a sound signal. The equalization processor 20 obtains the first error e1 which is a difference between an output of one specific tap in the multiple delay equalizers 21, 22 and a predetermined reference value, and calculates the first weight W1 with which the first error e1 is minimized. The equalization processor 20 causes the calculation result of the first weight W1 to be reflected in all taps in the multiple delay equalizers 21, 22 except the specific tap, obtains the second error e2 which is a difference between the outputs of all taps in the multiple delay equalizers 21, 22 and the predetermined reference value, and calculates the second weight W2 with which the second error e2 is minimized. Further, the equalization processor 20 updates the coefficients of all taps in the multiple delay equalizers 21, 22 at the same timing using the calculation results of the first weight W1 and the second weight W2, and calculates the output y of the equalization processor 20.

Therefore, it is possible to perform more appropriate equalization processing in the multi-tap phase diversity method in which the spatial equalization and the temporal equalization is combined.

Further, the receiving method according to the present embodiment is a receiving method to be performed in the receiving device including the equalization processor 20 which has the multiple delay equalizers 21, 22 that respectively receive multiple reception signals through the array antennas 11, 12, and which performs equalization processing of the spatial equalization and the temporal equalization on the reception signal. The receiving method includes: in the equalization processor 20, obtaining the first error e1 which is a difference between an output of one specific tap in the multiple delay equalizers 21, 22 and a predetermined reference value; calculating the first weight W1 with which the first error e1 is minimized, causing the calculation result of the first weight W1 to be reflected in all taps in the multiple delay equalizers 21, 22 except the specific tap; obtaining the second error e2 which is a difference between the outputs of all taps in the multiple delay equalizers 21, 22 and the predetermined reference value; calculating the second weight W2 with which the second error e2 is minimized; updating the coefficients of all taps in the multiple delay equalizers 21, 22 at the same timing using the calculation results of the first weight W1 and the second weight W2, and calculating the output y of the equalization processor 20.

Therefore, it is possible to perform more appropriate equalization processing in the multi-tap phase diversity method in which the spatial equalization and the temporal equalization is combined.

Although various embodiments have been described above with reference to the drawings, it is needless to say that the present disclosure is not limited to such examples. It is obvious that a person skilled in the art can conceive various modifications or corrections within the scope defined by the claims, and such modifications or corrections shall be regarded as belonging to the technical scope of the present disclosure. In addition, the components according to the above-described embodiments may be freely combined with one another, without departing from the scope of the present disclosure.

This application is based on Japanese Patent Application No. 2018-066239 filed Mar. 29, 2018, the contents of which are incorporated herein by reference.

The present disclosure is useful as a receiving device, a receiving method, and a receiving system capable of performing more appropriate equalization processing in a multi-tap phase diversity method in which the spatial equalization and the temporal equalization is combined.

The invention claimed is:

1. A receiving device comprising:
an equalization processor which comprises multiple delay equalizers that respectively receive multiple reception signals through an array antenna, and which performs equalization processing of spatial equalization and temporal equalization on the reception signals,
wherein the equalization processor is configured to:
  obtain a first error which is a difference between an output of one specific tap in the multiple delay equalizers and a predetermined reference value, and calculate a first weight with which the first error is minimized;
  cause a calculation result of the first weight to be reflected in all taps in the multiple delay equalizers except the specific tap, obtain a second error which is a difference between outputs of all taps in the multiple delay equalizers and the predetermined reference value, and calculate a second weight with which the second error is minimized; and
  update coefficients of all taps in the multiple delay equalizers at the same timing using the calculation result of the first weight and a calculation result of the second weight, and calculate an output of the equalization processor.

2. The receiving device according to claim 1,
wherein each of the multiple delay equalizers has N taps of a first tap to an n-th tap, where N indicates an integer greater than or equal to 2, and
wherein the equalization processor is configured to:
  specify the specific tap among the N taps as a tap for performing spatial equalization, calculate the first weight based on an output of the specific tap in the multiple delay equalizers, and update a coefficient of the specific tap, in a state where an update amount of the specific tap is reflected in the first tap to the n-th tap except the specific tap, calculate a second weight based on outputs of the N taps of the first tap to the n-th tap, and update coefficients of the first tap to the n-th tap except the specific tap, and update the coefficient of the specific tap based on the first weight and the coefficients of the first tap to the n-th tap except the specific tap based on the second weight at the same update timing.

3. The receiving device according to claim 2,
wherein each of the multiple delay equalizers comprises N−1 delay elements and N complex multipliers of the first tap to the n-th tap connected to input sides and output sides of the N−1 delay elements.

4. The receiving device according to claim 3,
wherein the equalization processor comprises:
a first combiner configured to combine outputs of the complex multipliers of the specific tap of the multiple delay equalizers;
a first adder configured to output, as the first error, a difference between an output of the first combiner and the reference value;
a first weight calculator configured to calculate the first weight based on the first error output from the first adder and update the first weight to update the coefficient of the specific tap.

5. The receiving device according to claim 4,
wherein the equalization processor calculates the update amount of the specific tap based on a first weight before update and a first weight after update.

6. The receiving device according to claim 5,
wherein the equalization processor reflects the update amount of the specific tap in the first tap to the n-th tap except the specific tap by multiplying weights of the first tap to the n-th tap except the specific tap by the update amount of the specific tap.

7. The receiving device according to claim 6,
wherein the equalization processor further comprises:
a second combiner configured to combine outputs of the complex multipliers of the N taps of the multiple delay equalizers;
a second adder configured to output, as the second error, a difference between an output of the second combiner and the reference value;
a second weight calculator configured to calculate the second weight based on the second error output from the second adder and update the second weight to update the coefficients of the first tap to the n-th tap except the specific tap.

8. The receiving device according to claim 1,
wherein the same timing is the same frame as a time unit.

9. A receiving system, comprising:
a reception signal input device which inputs a reception signal of a radio wave;
an equalization processor which performs equalization processing of the reception signal; and
a sound signal output device which outputs an equalized signal,
wherein the reception signal input device comprises:
an array antenna comprising multiple antennas that receive radio waves of a desired wave; and
front ends configured to perform frequency conversion of the received multiple signals, respectively, wherein the sound signal output device comprises:
an output signal amplifier that amplifies the equalized signal; and
a sound output device that outputs an amplified signal as a sound signal, and
wherein the equalization processor comprises multiple delay equalizers that respectively receive multiple reception signals, and performs equalization processing of spatial equalization and temporal equalization on the reception signals, the equalization processor being configured to:
obtain a first error which is a difference between an output of one specific tap in the multiple delay equalizers and a predetermined reference value, and calculate a first weight with which the first error is minimized;
cause a calculation result of the first weight to be reflected in all taps in the multiple delay equalizers except the specific tap, obtain a second error which is a difference between outputs of all taps in the multiple delay equalizers and the predetermined reference value, and calculate a second weight with which the second error is minimized; and
update coefficients of all taps in the multiple delay equalizers at the same timing using the calculation result of the first weight and a calculation result of the second weight, and calculate an output of the equalization processor.

10. The receiving system according to claim 9,
wherein each of the multiple delay equalizers has N taps of a first tap to an n-th tap, where N indicates an integer greater than or equal to 2, and
wherein the equalization processor is configured to:
specify the specific tap among the N taps as a tap for performing spatial equalization, calculate the first weight based on an output of the specific tap in the multiple delay equalizers, and update a coefficient of the specific tap,
in a state where an update amount of the specific tap is reflected in the first tap to the n-th tap except the specific tap, calculate a second weight based on outputs of the N taps of the first tap to the n-th tap, and update coefficients of the first tap to the n-th tap except the specific tap, and
update the coefficient of the specific tap based on the first weight and the coefficients of the first tap to the n-th tap except the specific tap based on the second weight at the same timing.

11. The receiving system according to claim 10,
wherein each of the multiple delay equalizers comprises N−1 delay elements and N complex multipliers of the first tap to the n-th tap connected to input sides and output sides of the N−1 delay elements.

12. The receiving system according to claim 11,
wherein the equalization processor comprises:
a first combiner configured to combine outputs of the complex multipliers of the specific tap of the multiple delay equalizers;
a first adder configured to output, as the first error, a difference between an output of the first combiner and the reference value;
a first weight calculator configured to calculates the first weight based on the first error output from the first adder and update the first weight to update the coefficient of the specific tap.

13. The receiving system according to claim 12,
wherein the equalization processor calculates the update amount of the specific tap based on a first weight before update and a first weight after update.

14. The receiving system according to claim 13,
wherein the equalization processor reflects the update amount of the specific tap in the first tap to the n-th tap except the specific tap by multiplying weights of the first tap to the n-th tap except the specific tap by the update amount of the specific tap.

15. The receiving system according to claim 14,
wherein the equalization processor further comprises:
   a second combiner configured to combine outputs of the complex multipliers of the N taps of the multiple delay equalizers;
   a second adder configured to output, as the second error, a difference between an output of the second combiner and the reference value;
   a second weight calculator configured to calculate the second weight based on the second error output from the second adder and update the second weight to update the coefficients of the first tap to the n-th tap except the specific tap.

16. The receiving system according to claim 9,
wherein the same timing is the same frame as a time unit.

17. A receiving method to be performed in a receiving device, the receiving device comprising: an equalization processor which comprises multiple delay equalizers that respectively receive multiple reception signals through an array antenna, and which performs equalization processing of spatial equalization and temporal equalization on the reception signals, the receiving method comprising:
   obtaining a first error which is a difference between an output of one specific tap in the multiple delay equalizers and a predetermined reference value, and calculating a first weight with which the first error is minimized,
   causing a calculation result of the first weight to be reflected in all taps in the multiple delay equalizers except the specific tap, obtaining a second error which is a difference between outputs of all taps in the multiple delay equalizers and the predetermined reference value, and calculating a second weight with which the second error is minimized, and
   updating coefficients of all taps in the multiple delay equalizers at the same timing using the calculation result of the first weight and a calculation result of the second weight, and calculating an output of the equalization processor.

18. The receiving method according to claim 17,
wherein each of the multiple delay equalizers has N taps of a first tap to an n-th tap, where N indicates an integer greater than or equal to 2, and
wherein the receiving method comprises:
   specifying the specific tap among the N taps as a tap for performing spatial equalization, calculate the first weight based on an output of the specific tap in the multiple delay equalizers, and update a coefficient of the specific tap;
   causing an update amount of the specific tap to be reflected in the first tap to the n-th tap except the specific tap, calculating a second weight based on outputs of the N taps of the first tap to the n-th tap, and updating coefficients of the first tap to the n-th tap except the specific tap; and
   updating the coefficient of the specific tap based on the first weight and the coefficients of the first tap to the n-th tap except the specific tap based on the second weight at the same timing.

19. The receiving method according to claim 18,
wherein the causing the update amount of the specific tap to be reflected in the first tap to the n-th tap except the specific tap comprises:
   calculating the update amount of the specific tap based on a first weight before update and a first weight after update; and
   multiplying weights of the first tap to the n-th tap except the specific tap by the update amount of the specific tap.

20. The receiving method according to claim 17,
wherein the same timing is the same frame as a time unit.

* * * * *